United States Patent [19]

Ross

[11] 4,092,655
[45] May 30, 1978

[54] RADIANT ENERGY RECORDING APPARATUS

[76] Inventor: Joseph A. Ross, 26 Trescott Path, Fort Salonga, N.Y. 11768

[21] Appl. No.: 700,813

[22] Filed: Jun. 29, 1976

[51] Int. Cl.² ............................................. G03B 35/08
[52] U.S. Cl. ..................................... 354/124; 354/125
[58] Field of Search ............... 354/110, 114, 117, 118, 354/120, 124, 125, 354

[56] References Cited

U.S. PATENT DOCUMENTS

| | | | |
|---|---|---|---|
| 3,573,045 | 3/1971 | Lemelson | 96/27 R |
| 3,703,135 | 11/1972 | Lang | 354/120 |
| 3,850,522 | 11/1974 | Vane et al. | 354/124 X |
| 3,866,052 | 2/1975 | DiMatteo et al. | 250/558 |
| 3,967,289 | 6/1976 | Yevick | 354/125 |

Primary Examiner—L. T. Hix
Assistant Examiner—M. L. Gellner
Attorney, Agent, or Firm—Watson, Leavenworth, Kelton & Taggart

[57] ABSTRACT

A recorder has plural spaced radiant energy issuing locations juxtaposed with an expanse of a recording medium. Upon exposure of the medium, it is advanced relative to the locations by an amount fractionally related to the spacing of the locations and is again exposed. The practice is repeated with the cumulative recording medium advance being no more than the spacing of the locations whereby a single film frame accommodates plural exposures. The radiant energy issuing locations may be defined by slots in a grating member juxtaposed with the recording medium in a lens field of view.

15 Claims, 12 Drawing Figures

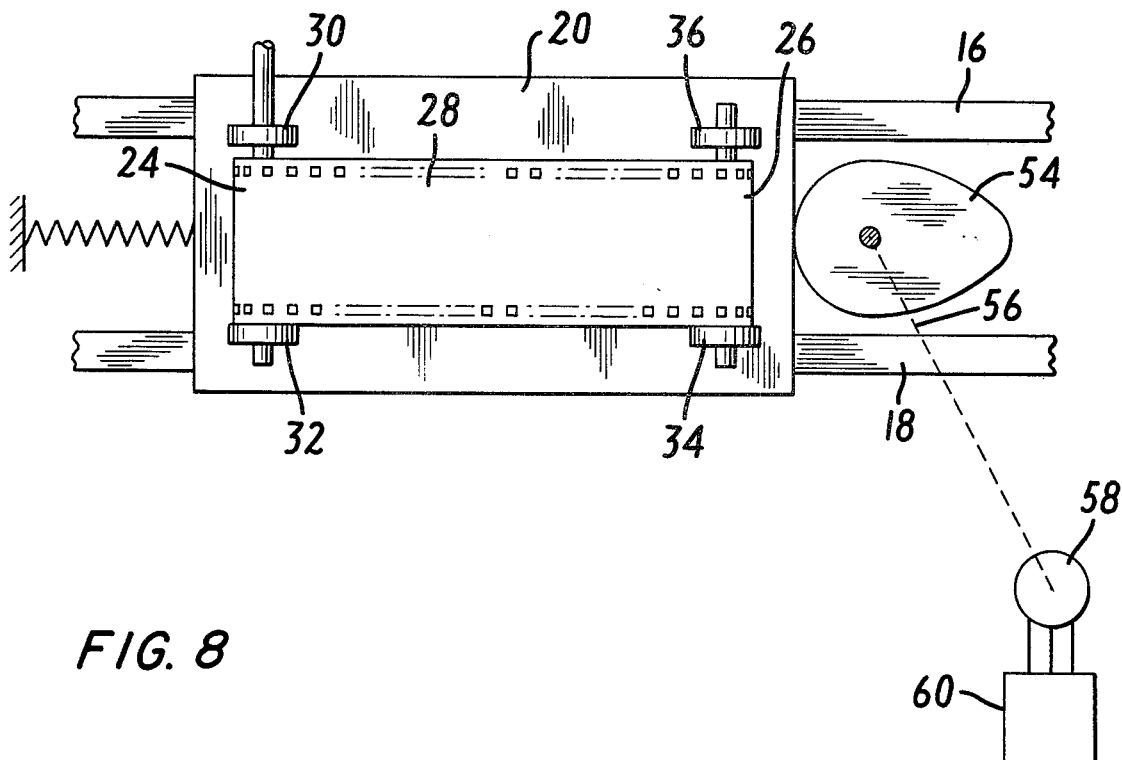
FIG. 8
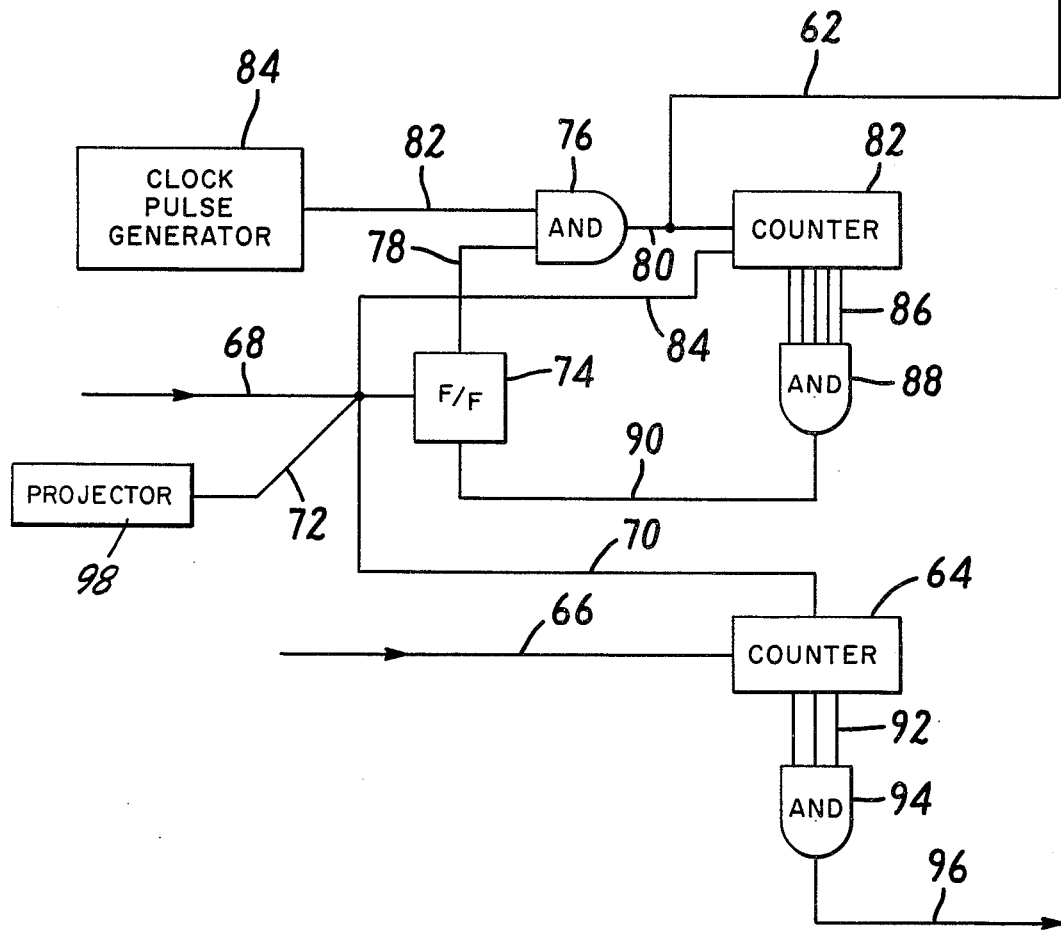

RADIANT ENERGY RECORDING APPARATUS

FIELD OF THE INVENTION

This invention relates to radiant energy recording apparatus and systems and to methods for use in defining object surfaces.

BACKGROUND OF THE INVENTION

In instances in radiant energy examination of objects, need exists for providing a sequence of records, for example, developed photographic film strips, indicating radiant energy reflected by an object in the course of permutations in projected radiant energy. The record sequence is then examined by examining successive film frames to determine, by the contents thereof, the effect of the radiant energy projection permutations. By way of example of this practice, in U.S. Pat. No. 3,866,052, involving applicant herein, a practice is disclosed wherein an object surface is irradiated successively through different radiant energy transmissive masks and records are made of the object surface return for each such irradiation. In accordance with the spatial location of the object surface in relation to the lens of the recording apparatus, and further depending upon the structure of the masks, the object surface will be evidenced only in selective of the records. For purposes of providing indication of the object surface spatial location, signals are generated from examination of the records, with the signals being indicative both of the number of records in the succession and those particular records evidencing a return from the object surface.

This practice of the U.S. Pat. No. 3,866,052 is somewhat encumbered by its need for film frames in number equal to the number of individual radiant energy projections. Thus, if the number of different masks employed in the projection sequence is 10, 10 film frames are employed. The cost of such practice is accordingly increased by film consumption and the time involved in separately examining each film frame.

SUMMARY OF THE INVENTION

It is an object of the present invention to provide apparatus and systems accommodating plural projection radiant energy practices with reduced recording medium usage.

It is a further object of the invention to simplify recording medium examination in plural projection radiant energy practices.

It is a still further object of the invention to provide improvements in the methods of the U.S. Pat. No. 3,866,052 above discussed.

In attaining the foregoing and other objects, the invention provides a radiant energy recorder having means for supporting an expanse of a recording medium, a radiant energy conducting unit with at least first and second individual conductors in spaced disposition to issue energy onto respective first and second spaced extents of the recording medium expanse, and a translator device for moving the recording medium to expose a third recording medium extent between such first and second extents to radiant energy issuing solely from the first conductor and to expose a fourth recording medium extent successive to the second extent to radiant energy issuing solely from the second conductor. In a preferred recorder embodiment, the recording medium is supported for movement by take-up and supply spools and is further movable jointly with such spools. A translator element jointly displaces the recording medium and its take-up and supply spools through a fraction of single frame length for exposure of the frame.

In improved practice of the methods of U.S. Pat. No. 3,866,052, radiant energy reflected from an object surface is conducted in plural parts, each to a distinct one of plural spaced locations adjacent a recording medium. The recording medium is advanced, following each projection through an individual mask, an amount fractionally related to the separation between successive such locations in accordance with the number of separate projections.

In further clarification of the invention, reference is made to Lemelson U.S. Pat. No. 3,573,045. In such patent, apparatus is shown wherein a single radiant energy conducting channel (a slot in a plate member) is juxtaposed with a recording medium translated continuously in accordance with movement of an object continuously irradiated. The practices in the subject invention depart from those of the Lemelson patent in overall aspect, i.e., herein an object is irradiated in time-successive diverse manner as contrasted with uniform illumination in the Lemelson patent, and in its specific recorder aspects, i.e., herein spaced energy collecting locations are in communication with the recording medium and the medium is advanced fractional amounts of a frame length for plural exposures thereof.

The foregoing and other objects and features of the invention will be evident from the following detailed description of preferred embodiments and practices and from the drawings wherein like reference numerals identify like parts throughout.

DESCRIPTION OF THE DRAWINGS

FIG. 8 shows a translator element in combination with the FIG. 1 translator apparatus together with a control system for operation thereof.

DESCRIPTION OF THE PREFERRED EMBODIMENTS AND PRACTICES

Figure 1:
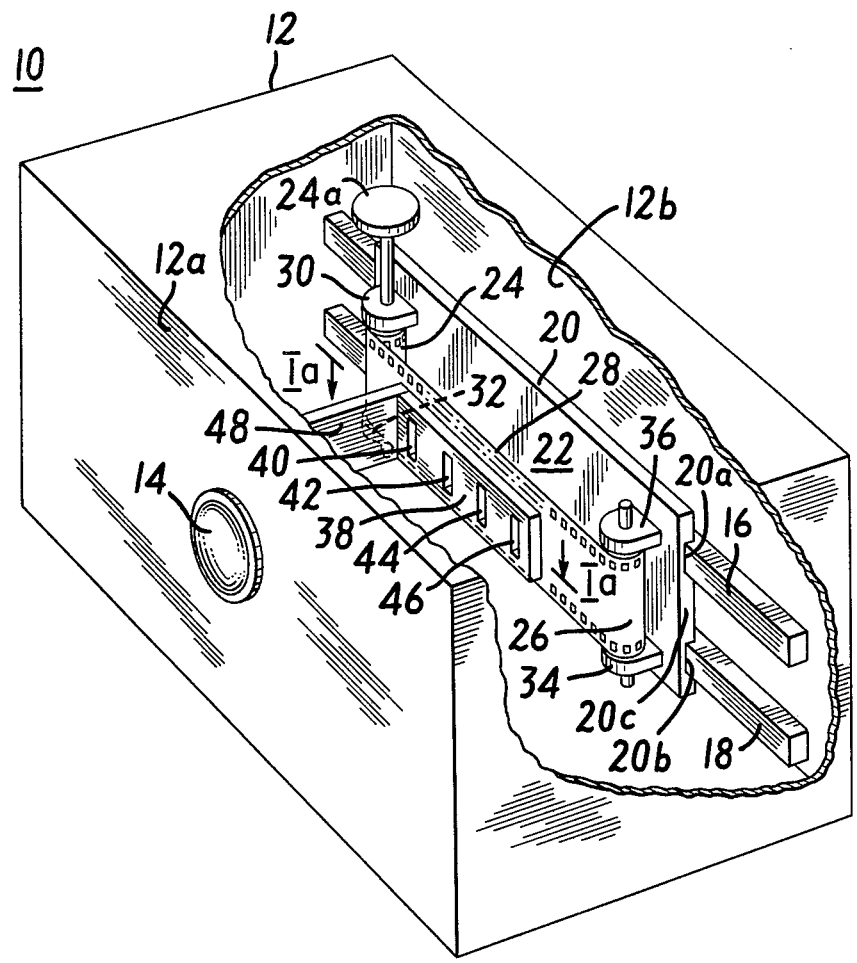
FIG. 1 is a perspective view of recording apparatus according with the invention, broken away in part to show detail.

Referring to FIG. 1, recorder 10 includes housing 12 having lens 14 disposed in forward wall 12a. Adjacent its rearward wall 12b, the housing supports a pair of guide tracks 16 and 18 extending transversely as illustrated. A plate 20 has rearward grooves 20a and 20b of dimension cooperative with tracks 16 and 18 whereby plate 20 is movable along tracks 16 and 18.

Film supporting and advancing mechanism 22 includes a take-up or film-collecting spool 24 and a supply or film-dispensing spool 26 which are mutually spacedly disposed to support an expanse of film 28 therebetween. Film 28 is advanced framewise by customary engagement of sprocket wheels and film sprockets upon rotation of take-up knob 24a. Mechanism 22 is secured to plate 20 by supports 30, 32, 34 and 36 as indicated.

Figure 1A:
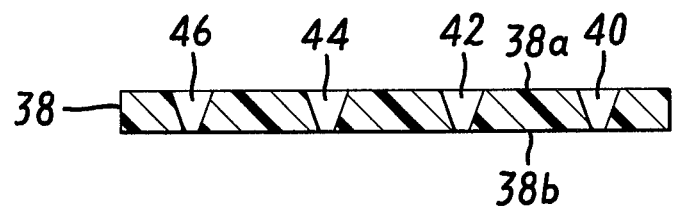
FIG. 1a is a sectional view of a preferred embodiment of a radiant energy conducting unit according with the invention as seen from plane 1a–1a of FIG. 1.

A radiant energy (e.g., light) conducting unit, in the form of grating member 38 includes slots 40, 42, 44 and 46 for defining separate radiant energy issuing locations in spaced disposition in juxtaposition with film 28. Member 38 is fixedly secured to housing 12 by support arm 48. As shown in FIG. 1a member 38 is preferably formed with tapered slots having light-reflective coatings on the slot side surfaces, with surface 38a thereof facing lens 14 and surface 38b thereof facing film 28.

As will be noted in FIG. 1, film 28 may be advanced relative to member 38 either by operation of winding knob 24a or by translation of plate 20. In the former movement, the film is advanced relative to plate 20 and, in the latter case, is advanced jointly with plate 20. Selection of one or the other of these two varieties of film advance in accordance with the invention is now discussed in connection with FIGS. 2a-2d.

Figure 2A:
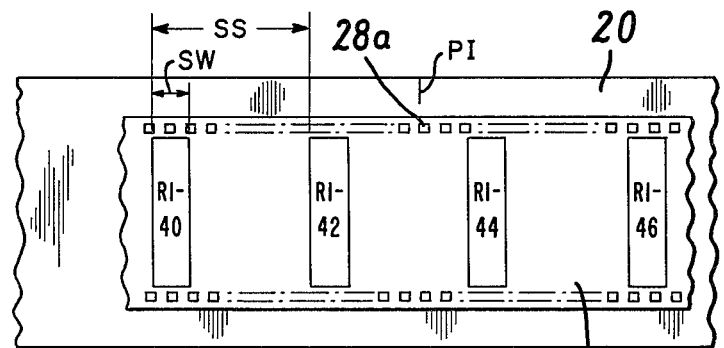
FIGS. 2a–2d are schematic illustrations useful in describing the invention.
Figure 2B:
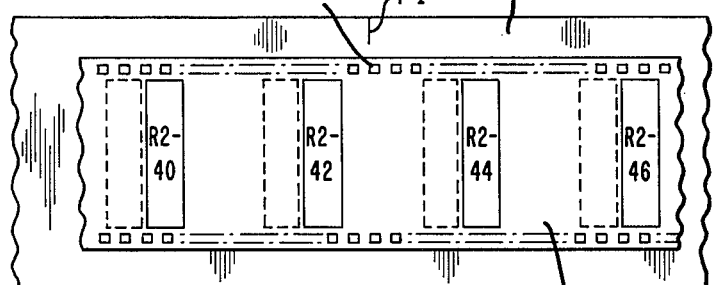
Figure 2C:
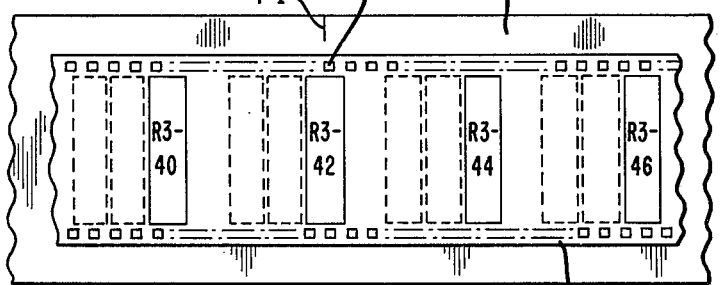
Figure 2D:
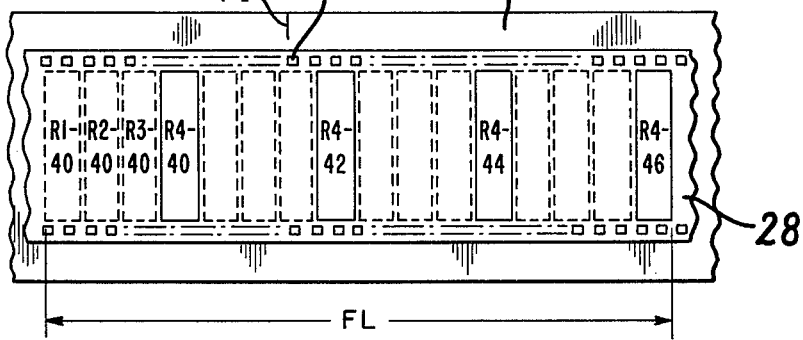

In FIG. 2a, film 28 is shown as having been exposed through member 38, thereby containing four separate and mutually spaced recordings, R1-40, i.e., an initial record made through slot 40, R1-42, R1-44 and R1-46. Dimension SW indicates slot width and dimension SS indicates slot-to-slot spacing. In FIG. 2b, film 28 is advanced leftwardly from its FIG. 2a position, jointly with plate 20, as indicated by the unchanged relation between plate index PI and film slot 28a, by a distance of one slot width. On exposure of the film in its FIG. 2b position, additional records R2-40 (second record through slot 40), R2-42, R2-44 and R2-46 are made. The film is now advanced again by one slot width jointly with plate 20 in FIGS. 2c and 2d whereby additional records R3-40 through R4-46 are made. At this juncture, a full frame length FL has been exposed and the plate is translated rightwardly until plate index PI is in its FIG. 2a location. Knob 24 of FIG. 1 may then be operated to advance film 28 relative to plate 20 to bring the leftward edge of a successive unexposed film frame into the FIG. 2a disposition in registry with the leftward side of slot 40.

As will be seen from FIGS. 2a-2d, frame length is defined as the product of the number of slots and the slot-to-slot (SS) spacing, providing the measure of film advance by operation of film advancing mechanism 22, and the amount of film advance jointly with mechanism 22 between successive exposures is in measure equal to slot width SW. The cumulative amount of film advance jointly with mechanism 22, between successive operations of mechanism 22, is SS at its maximum. In the illustrative showing, with four energy issuing locations, SS is at most one-quarter of FL and SW is at most one-sixteenth of FL.

Figure 3:
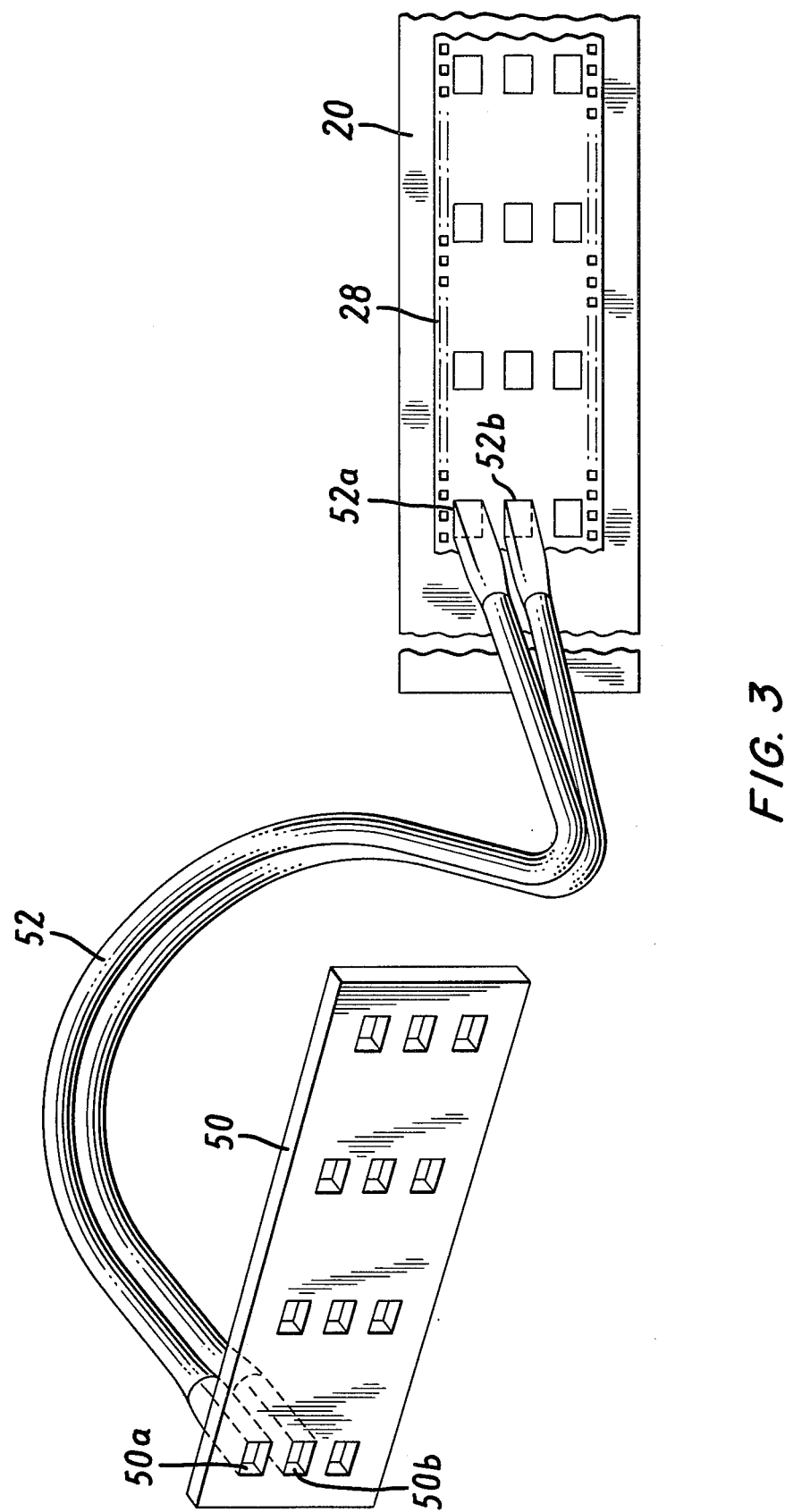
FIG. 3 illustrates a further embodiment of radiant energy conducting apparatus of the invention of fiber optic variety.
Figure 4:
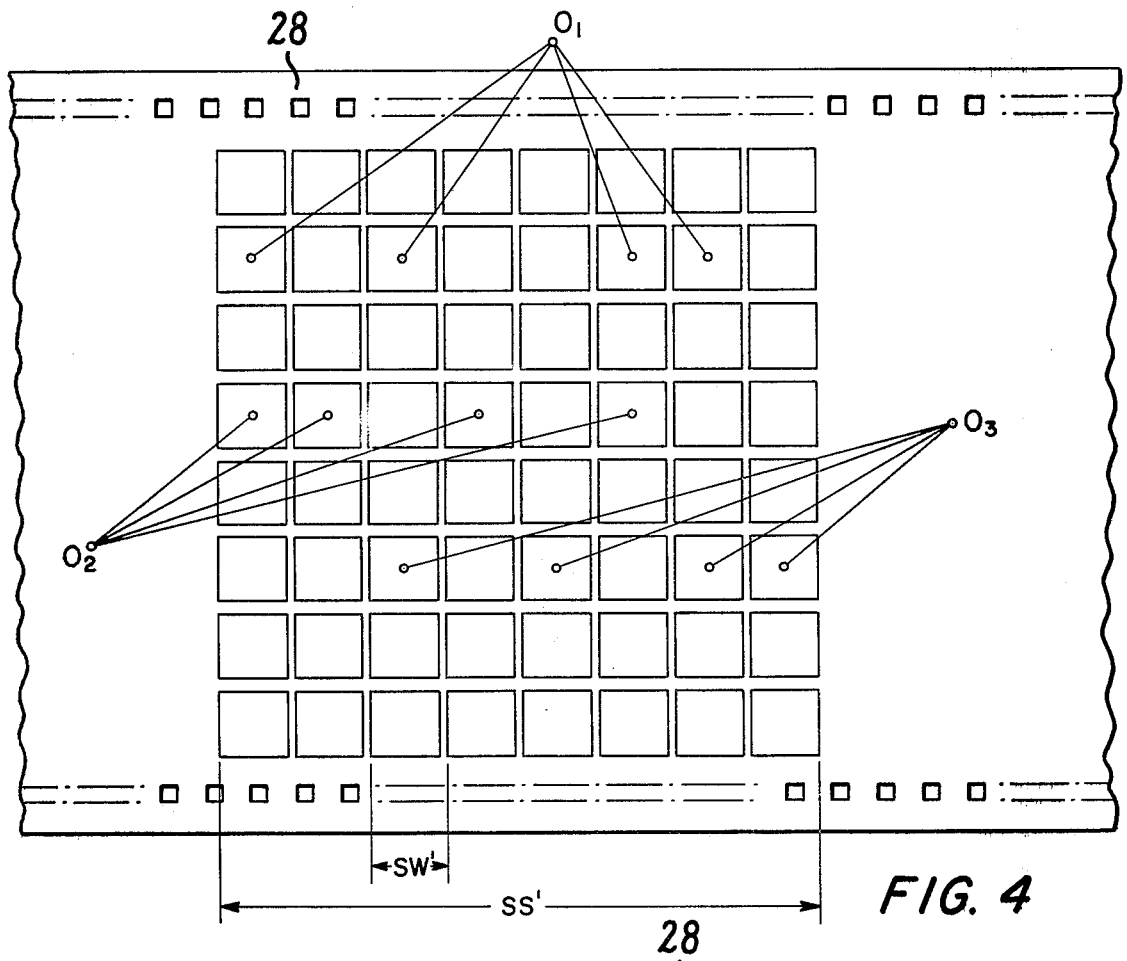
FIG. 4 illustrates a developed record provided by the invention.

Referring to FIG. 3, a different embodiment of radiant energy conducting unit comprises plate 50 having apertures as indicated at 50a and 50b with a fiber optic or like assembly 52 extending from plate 50 to individual energy issuing locations 52a, 52b, etc. juxtaposed with film 28. While assembly 52 and plate 50 are shown in FIG. 3 as providing a four-column (vertical) by three-row (horizontal) exposure of film 28, a more desired arrangement would provide the partial frame length photograph shown in FIG. 4 which involves eight rows and wherein film 28 is incremented between exposures an amount equal to slot width SW' to provide eight columns of exposure over slot spacing distance SS'.

Figure 5:
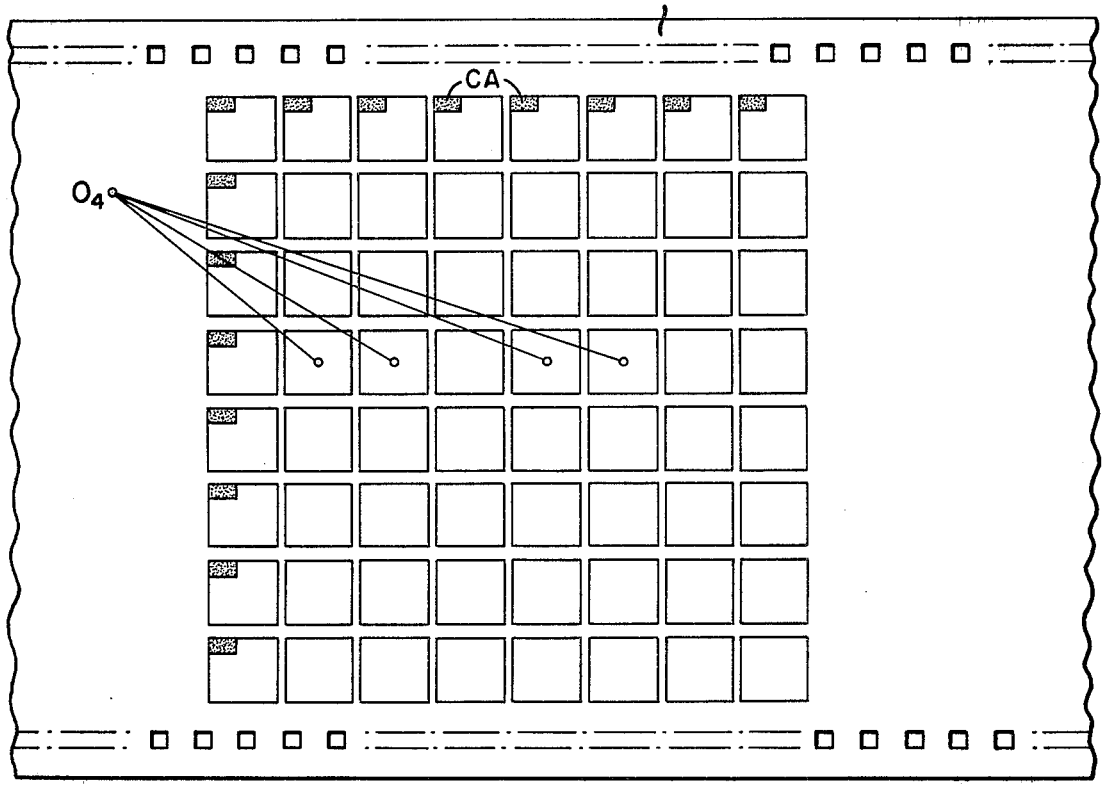
FIG. 5 illustrates a further developed record including a synchronization pattern.
Figure 6:
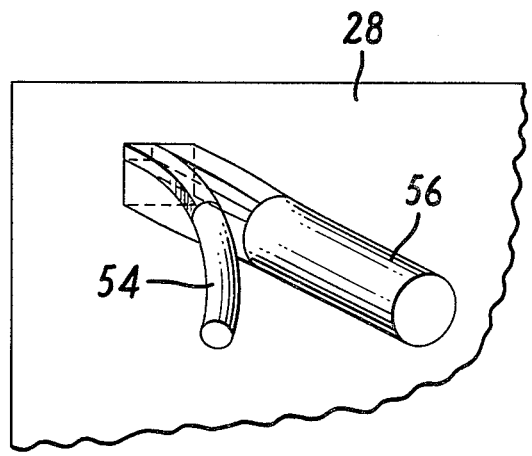
FIG. 6 is a perspective view showing a fiber optics arrangement suitable for use in obtaining the FIG. 5 developed record.

For convenience in examining records made in accordance with the invention, a synchronization pattern is preferably provided, as shown in FIG. 5, wherein the vertical column exposures of the first exposure of the record include such as a corner area CA exposed irrespective of object-reflected radiant energy, as do all exposures of a given row of the record, e.g., the top row in FIG. 5. The apparatus shown in FIG. 6 is effective to provide such synchronization pattern. As illustrated, the fiber optics tube is bifurcated to define tube sections 54 and 56. Section 56 conducts object-reflected radiant energy to film 28 while tube section 54 receives energy from a suitable shuttered light source. Tube sections 54 are arranged coincidently with corner areas CA and all of tube sections 54 are supplied with radiant energy from the source at the time of the first exposure of each succession of exposures defining a frame.

As an alternative to the synchronizing scheme of FIGS. 5 and 6, an unbifurcated fiber optics assembly of type shown in FIG. 3 may be employed. The fibers of the first vertical column and the top horizontal row are supplied with radiant energy from the source prior to the initial exposure of the recording medium to object-reflected energy. The recording medium is then advanced one slot width and exposed to object-reflected energy. In this alternative synchronization scheme, the top row and first vertical column will be seen to be used solely for providing the recording medium with a sync pattern.

Considering use of the invention in practice under the U.S. Pat. No. 3,866,052 above-discussed, incorporating reference is now made to that patent. As alluded to above, such U.S. Pat. No. 3,866,052 practice would successively project light energy onto an object through different masks, i.e., masks having respectively different arrangements of light-transmissive and light-opaque character, as shown in FIG. 2 of the U.S. Pat. No. 3,866,052. In the course of each projection and accompanying film exposure, a given object will or will not be illuminated by the light source depending upon whether it is in unblocked line-of-sight relation to the light source or is masked therefrom.

Referring back to FIG. 4, and considering the partial developed record to be made by practice of such U.S. Pat. No. 3,866,052 method, returns from objects $O_1$, $O_2$ and $O_3$ are shown respectively in the second, fourth and sixth horizontal rows. On examination of the record of FIG. 4, one may generate the digital signal 10100110 for object $O_1$ (indicating the object to be evidenced in the first, third, sixth and seventh of the eight exposures), the digital signal 11010100 for object $O_2$ and the digital signal 00101011 for object $O_3$. Similarly, in FIG. 5, one would observe for object $O_4$ the digital signal 01101100. As is discussed more fully in the U.S. Pat. No. 3,866,052, such digital signals are generated, for example, by examination of each record, or record subsection in accordance with the present invention, by a light source and detector aligned with each other at specific x and y locations measured with respect to a reference location of the record.

In the presently improved practice of the method of the U.S. Pat. No. 3,866,052, light reflected onto a lens or onto member 50 of FIG. 3 is conducted in plural parts, e.g., through apertures 50a, 50b or slots 40–46 (FIG. 1), each to a distinct one of plural spaced locations juxtaposed with a recording medium. Following each projection, the recording medium is advanced by an amount fractionally related to the separation between successive such locations, such fraction being at most the inverse of the number of separate projections. One may now generate the above-noted digital signals from a single film frame in contrast to examination of plural film frames.

Figure 7:
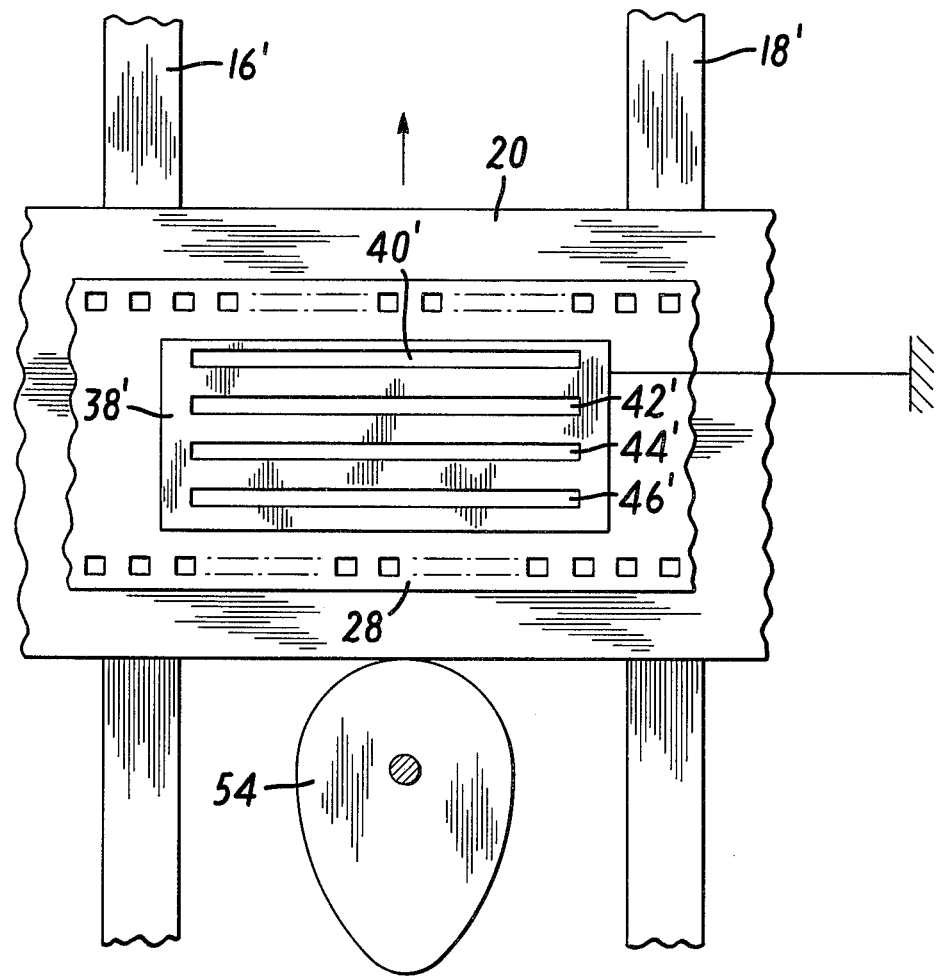
FIG. 7 is a front elevational view of a further embodiment of translator apparatus according with the invention.

Turning now to FIG. 7, plate 20 is shown supported on guide tracks 16' and 18', extending transversely to tracks 16 and 18 of FIG. 1. Grating member 38' is fixedly supported and includes horizontal slots 40', 42', 44' and 46'. Film 28 is supported on plate 20 as discussed in connection with FIG. 1 for horizontal advance on take-up spool rotation. Plate 20 is translated as indicated by the arrow by translator cam 55.

FIG. 8 shows plate 20 spring-biased into engagement with translator cam 55 for movement along tracks 16 and 18, as in the FIG. 1 embodiment. Translator drive shaft 56 is rotated by stepping motor 58 as energized by stepping motor controller 60. Controller 60 is operated by control system 62 in manner now discussed.

Exposure counter 64 is cleared of its contents by input thereto on line 66. A start exposure signal is now applied to line 68 and increments counter 64 over line 70. Such start exposure signal also energizes the radiant energy projection source (projector 98) over line 72 to expose the film and sets flip-flop 74. On being set, flip-flop 74 applies an ON (first voltage level) signal to AND gate 76 over line 78. Output line 80 of gate 76 thereupon goes ON and OFF (second voltage level) coincidently with clock pulses applied to the gate over line 82 by clock pulse generator 84. Line 62 applies the line 80 signals to controller 60 which steps motor 58 during ON periods of the signals.

Plate translation counter 82 is cleared by the start exposure signal over line 84 and is incremented by the line 80 signals. Output lines 86 of counter 82 are selected to go jointly ON upon attainment of a count by counter 82 according with the desired amount of translation of plate 20 between successive exposures. AND gate 88 thereupon applies an ON signal to line 90, resetting flip-flop 74 and disabling gate 76. Line 62 is thus driven OFF and motor 58 rotation discontinued. A start exposure signal is now again applied to line 68 and this cycle repeats with counter 64 now incremented to its second count.

As counter 64 reaches a predetermined count, equal to the number of exposures per film frame, preselected output lines 92 of counter 64 go ON at which time AND gate 94 drives line 96 ON. Such line 96 ON condition may serve to energize an indicator for manual film frame advancement or apparatus for automated film frame advancement.

Translator cam is designed such that it imparts equal movements to plate 20 on equal angular rotations of shaft 56. Other translator mechanism may of course be employed, e.g., lead screw, rack and pinion, etc.

While the system of FIG. 8 accommodates desired step-wise translation of the record medium, the invention contemplates other intermittent and continuous movement of the record medium within the above-discussed limits whereby no record medium area is exposed to energy issuing from more than one issue location, i.e., no record medium area is to be exposed through more than one of slots 40–46, or through plural fibers (FIG. 3). Further, whereas preferred embodiments for the radiant energy conducting unit have been illustrated, the invention contemplates various forms thereof, for example, an apertured plate in juxtaposition with the recording medium, an apertured plate having cylindrical lens collectors in the apertures, plates with embedded spherical lenses, and the like. The foregoing and other modifications and changes from the particularly illustrated embodiments and specifically discussed practices and other changes evident to those skilled in the art may accordingly be introduced without departing from the invention. Thus, the foregoing specific disclosure is intended in an illustrative and not in a limiting sense. The true spirit and scope of the invention is defined in the following claims.

What is claimed is:
1. A radiant energy recorder system comprising:
   (a) projector means for projecting patterned radiant energy into the projection field thereof;
   (b) lens means having a field of view inclusive of at least part of said projection field;
   (c) means for supporting an expanse of recording medium;
   (d) a radiant energy conducting unit disposed between said lens means and said recording medium and having a plurality of commonly-shuttered conducting means in successive spaced disposition for issuing projected patterned radiant energy reflected to said lens means onto said recording medium expanse;
   (e) translator means for relatively moving said conducting unit and said recording medium supporting means; and
   (f) circuit means for controlling operation of said projector means and said translator means for successively exposing adjacent extents of said recording medium expanse to patterned radiant energy issuing simultaneously from distinct ones of said conducting means.

2. The recorder system claimed in claim 1 wherein said translator means provides stepwise relative movements of said conducting unit and said recording medium supporting means, the cumulative measure of such stepwise movements being less than the spacing between adjacent ones of said plurality of conducting means.

3. The recorder system claimed in claim 2 including a housing for fixedly supporting said conducting means, said translator means engaging said recording medium supporting means for moving said recording medium supporting means relative to said housing.

4. The recorder system claimed in claim 3 wherein said recording medium supporting means includes recording medium advancing means engaging said recording medium for moving said recording medium relative to said recording medium supporting means.

5. The recorder system claimed in claim 1 wherein said translator means comprises a translator element and motive means for moving said translator element, said circuit means generating an output signal for energizing said motive means to move said translator element in predetermined extent fractionally related to the distance between said spaced locations of said radiant energy conducting means.

6. The recorder system claimed in claim 5 wherein said circuit means includes counter means for controlling energization of said motive means and thereby setting such extent of each said translator element movement.

7. The recorder system claimed in claim 6 wherein said circuit means generates a further signal upon the occurrence of a preselected number of said output signals.

8. A radiant energy recorder system comprising:
 (a) projector means for projecting patterned radiant energy into the projection field thereof;
 (b) lens means having a field of view inclusive of at least part of said projection field;
 (c) recording medium dispensing and collecting means for supporting an expanse of recording medium;
 (d) radiant energy conducting means disposed between said lens means and said recording medium expanse, said conducting means defining a plurality of commonly-shuttered mutually spaced locations for issuing onto said recording medium projected patterned radiant energy reflected to said lens means;
 (e) translator means for relatively moving said conducting means and said dispensing and collecting means; and
 (f) circuit means for controlling operation of said projector means and said translator means for exposing adjacent extents of said recording medium expanse to patterned radiant energy issuing simultaneously from distinct ones of said conducting means.

9. The recorder system claimed in claim 8 including plate means for supporting said dispensing and collecting means, said translator means engaging said plate means for moving said plate means and thereby moving said dispensing and collecting means relative to said conducting means.

10. The recorder system claimed in claim 9 further including a housing having means for guiding movement of said plate means, said conducting means being fixedly supported in said housing.

11. The recorder system claimed in claim 10 wherein said dispensing and collecting means includes advancing means engaging said recording medium for moving said recording medium relative to said plate means.

12. The recorder system claimed in claim 10 wherein said conducting means includes fiber optics means defining such conducting means radiant energy issuing locations.

13. A record-making method for use in object surface definition, comprising the steps of:
 (a) defining a projection field including at least a part of said object surface;
 (b) defining a lens field of view inclusive of such object surface part;
 (c) supporting an expanse of recording medium in the focal plane of such lens;
 (d) providing separate radiant energy conductive paths from said lens respectively to spaced radiant energy issuing locations adjacent said recording medium;
 (e) projecting into said projection field radiant energy patterned permutationally with respect to said object surface; and
 (f) lineally advancing said recording medium an amount fractionally related to the spacing between said radiant energy issuing locations for each such projected radiant energy pattern permutation, and commonly shuttering said radiant energy conductive paths thereby providing successive records, each lineally continuous in said recording medium, of such projected radiant energy reflected by said object surface.

14. The method claimed in claim 13 wherein said step (e) is practiced by projecting radiant energy successively into preselected segments of said projection field and wherein said step (f) is practiced in part by making a record of object-reflected radiant energy for each of such successive energy projections.

15. The method claimed in claim 14 wherein said step (e) is practiced in part by advancing the recording medium between each said successive energy projection an amount equal to the inverse of the total number of projections times the separation between successive of said radiant energy issuing locations.

* * * * *